April 15, 1952     E. L. DEVIS ET AL     2,592,794
COLLET CHUCK
Filed Oct. 16, 1948     2 SHEETS—SHEET 1
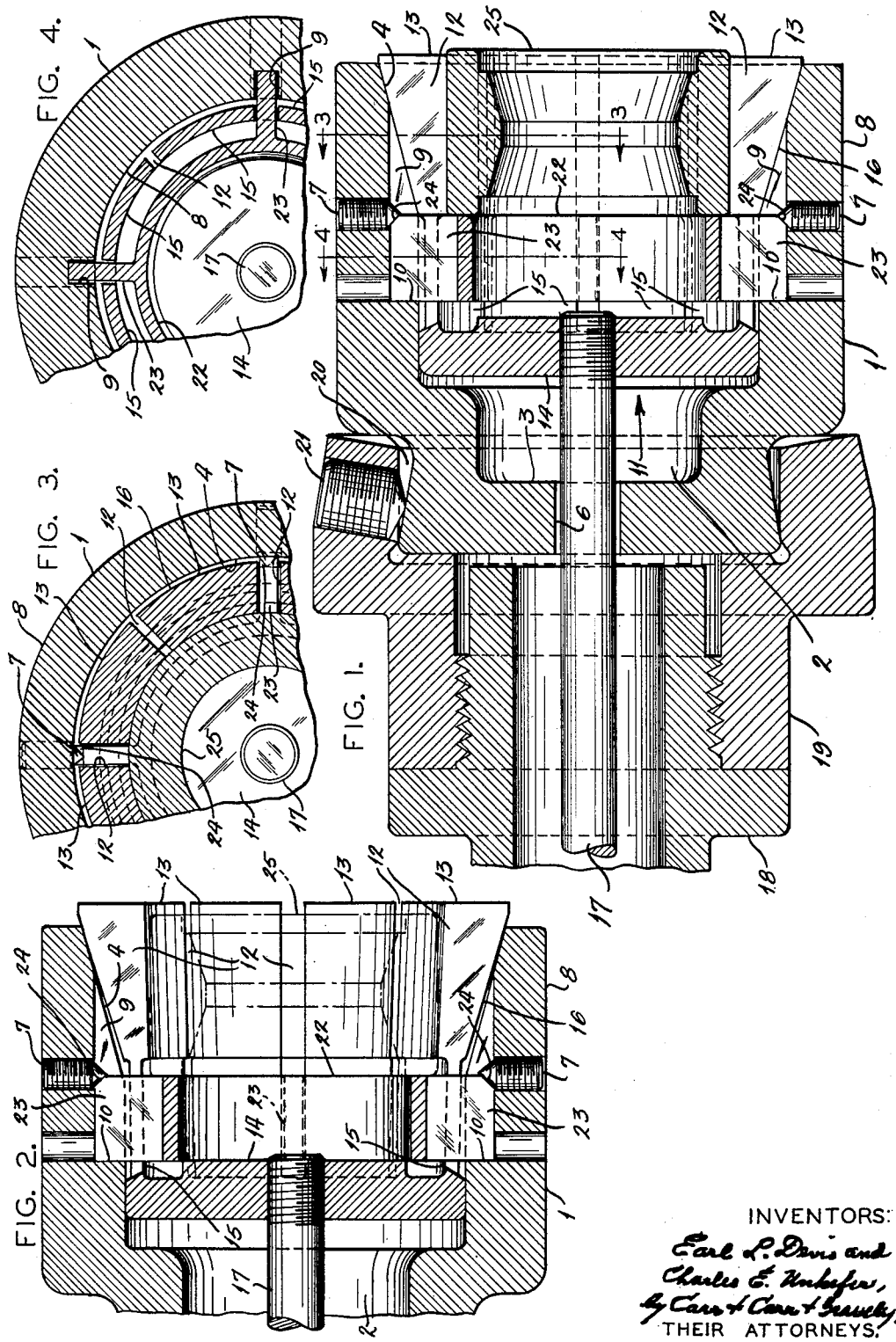
INVENTORS:
Earl L. Devis and
Charles E. Unkefer,
by Carr & Carr & Gravely,
THEIR ATTORNEYS.

April 15, 1952     E. L. DEVIS ET AL     2,592,794
COLLET CHUCK
Filed Oct. 16, 1948     2 SHEETS—SHEET 2
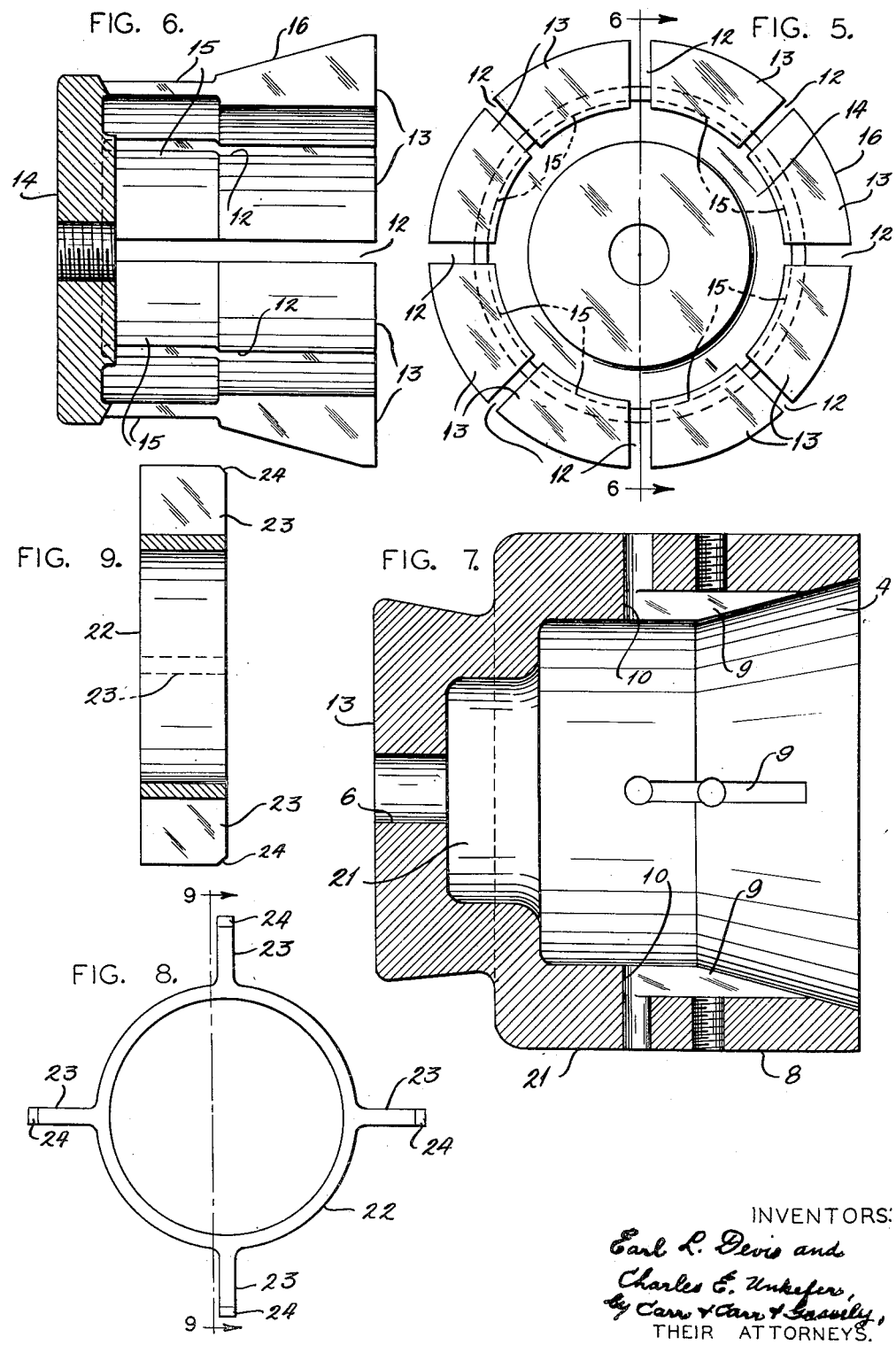
INVENTORS:
Earl L. Devis and
Charles E. Unkefer,
by Carr & Carr & Gasvily,
THEIR ATTORNEYS.

Patented Apr. 15, 1952

2,592,794

UNITED STATES PATENT OFFICE 2,592,794

COLLET CHUCK

Earl L. Devis and Charles E. Unkefer, Canton, Ohio, assignors to The Timken Roller Bearing Company, Canton, Ohio, a corporation of Ohio Application October 16, 1948, Serial No. 54,874

2 Claims. (Cl. 279—51)

Our invention is concerned with a collet chuck for holding the work in lathes, boring mills and other machine tools during the performance of machining operations.

It is a principal object of this invention to provide a chuck composed of relatively few parts and capable of ready assembly.

Another object is to provide a spring collet chuck with a back-up ring to position the work piece axially in the collet sleeve, procuring a more certain and easy alignment between these parts.

A further object of this invention is to provide a collet chuck in which the gripping action of the collet spring fingers does not affect the relative alinement of the axes of the work piece and the collet sleeve or the initial axial setting of the work piece.

With the above and other objects in view the present invention consists in the combinations and arrangements of parts hereinafter more fully described, illustrated in the accompanying drawings and particularly specified in the appended claims.

In the accompanying drawings, which form part of this specification and wherein like symbols refer to like parts wherever they occur, Fig. 1 is a central longitudinal sectional view showing our collet chuck mounted on the rotary spindle of a machine tool, the collet chuck being shown in closed position, Fig. 2 is a fragmentary section similar to Fig. 1, showing the collet chuck in open position, Fig. 3 is a fragmentary transverse sectional view on the line 3—3 in Fig. 1, Fig. 4 is a fragmentary transverse sectional view on the line 4—4 in Fig. 1, Fig. 5 is an outer end elevational view of the spring collet, Fig. 6 is a central longitudinal sectional view on the line 6—6 in Fig. 5, Fig. 7 is a central longitudinal sectional view of the collet sleeve, Fig. 8 is an outer end elevational view of the back-up ring; and Fig. 9 is a longitudinal section on the line 9—9 in Fig. 8.

In Figures 1 and 2, numeral 1 represents a collet sleeve of cylindrical conformation. The collet sleeve 1 has an axial socket 2, also of approximately cylindrical conformation. One end of said axial socket 2 is closed by base 3 of collet sleeve 1. The opposite end is open, terminating in flared mouth forming a conical inside collet surface 4. The base 3 is pierced by an axial bore 6 which communicates with the axial socket 2. The collet sleeve 1 is provided with radially disposed set screws 7 through its cylindrical wall 8. The cylindrical wall 8 is provided with longitudinal guide slots or grooves 9, on the inner surface thereof, whose end walls 10 are disposed radially, i. e., perpendicular to the longitudinal axis of said socket. The spring collet 11 is roughly cylindrical in design. The spring collet is provided with a circular series of longitudinal slots 12, forming gripping fingers 13. The fingers 13 are joined to base or inner end portion 14 of spring collet 11, by means of thin spring portions 15. The spring work gripping fingers 13 are tapered from their outer ends to their thin inner end portions 15 in conformity with the conical inside surface 4, forming a conical outside collet surface 16. Into base portion or member 14 of collet 11 is fitted a draw rod 17 by means of screw threads or equivalents thereof.

In Figure 1 the rotary hollow spindle 18 of a conventional machine tool is represented. Threadably disposed on spindle 18 is an adaptor 19 provided with an axial socket 20 and set screws 21. The spindle 18 and adaptor 19 together comprise the collet-holder.

The collet chuck also includes a back-up ring 22 having a circular series of radially disposed outstanding longitudinal lugs 23 on its outer periphery. Said radial lugs are provided with chamfered end edges 24 that are engaged by the conical ends of said set screws 7. The work piece is indicated by numeral 25.

In operation the collet sleeve 1 is placed in the adaptor socket 20 of the adaptor 19. The set screws 21 of the adaptor 19 are tightened fixing the collect sleeve 1 in position in the collet-holder.

The spring collet 11 is then fitted into the axial socket 2 of the collet sleeve 1. In this position, the conical outside collet surface 16 of collet 11 lies against and within the conical inside collet surface 4 of collet sleeve 1. The gripping fingers 13 of the collet 11 are thus contained within the conical mouth 4 of collet sleeve 1. The base member 14 of said collet lies adjacent and parallel to base 3 of the collet sleeve. Draw rod 17 projects through and beyond bore 6 of said base 3 and through the hollow rotary spindle 18 of the collet-holder.

Next the back-up ring 22 is placed within the spring collet 11. In order to accomplish this, the radial lugs 23 of said back-up ring 22 are slidably disposed in the slots 12 of the spring collet 11, through which they project radially. The length of said lugs is such that they rest in the longitudinal guide grooves 10 of collet sleeve 1.

Back-up ring 22 is moved inwardly toward the base 3 of collet sleeve 1 until its integral radial lugs 23 seat against the radial abutments 10 at the inner ends of the guide slots 9 for said lugs. When the back-up ring 22 reaches this position, the set screws 7 in the wall 8 of collet sleeve 1 are tightened against the chamfered ends 24 of said radial lugs. Tightening of the aforesaid set screws 7 fixes the back-up ring 18 rigidly with respect to collet sleeve 1.

The work piece 25 is then placed within the spring collet 11. It is slipped into the circular opening formed by the gripping ends of the fingers 13 of said collet. The work piece is pushed further within said collet until its movement is stopped by the now rigid back-up ring 22. The function of the back-up ring 22 is to supply support to the work piece 25 so that it will be secure against inward movement along the longitudinal axes of the spring collet 11 and its associated collet sleeve 1.

The draw rod 17 is then moved to the left in Figure 1. Said draw rod must be supported at its left end with respect to the collet sleeve 1 and rotary spindle 18. Such support may be accomplished by a nut or any suitable equivalent.

Movement of the draw rod to the left will suffice to force conical surfaces 4 and 16 of the collet sleeve 1 and collet 11, respectively, into spring opposition. As the draw rod 17 moves to the left, the gripping fingers 13 of the collet 11 will be forced radially inwardly toward the longitudinal axis of the spring collet. As the gripping fingers 13 move radially a gripping force is provided to secure the work piece 25 against radial movement relative to said longitudinal axis of said spring collet.

The work piece 25 may be removed by reversing the aforesaid movement of the draw rod 17. The conical collet surfaces 4 and 16 will be withdrawn from spring opposition and the spring fingers 13 of the collet 11 will release their grip upon the work piece.

It will be noted that neither the movement of the spring collet 11 to the left with respect to both the collet sleeve 1 and the back-up ring 22 nor its resultant effect, the radial movement of the gripping fingers 13 has any effect upon the longitudinal setting of the work piece 25 within the collet sleeve and against back-up ring 22.

By varying the depth of the back-up ring it is possible to accommodate various positionings of the work piece within the chuck.

What we claim is:

1. In a chuck, a collet sleeve closed at its inner end forming a socket and open at its opposite end in a mouth having an outwardly flared surface, said sleeve having axially directed guide grooves in its inner surface extending through said flared mouth and terminating adjacent said sleeve socket, a collet disposed in said sleeve, said collet having a base movably located in said sleeve socket and a plurality of integral, axially extending and circumferentially spaced fingers, said fingers having outer tapered surfaces engageable with and slidable relative to said flared surface of said sleeve mouth and inner spring portions adjacent said collet base, a collet draw rod extending through said sleeve at its closed inner end for connection into said collet base, and a work back-up ring having a plurality of radial lugs movable inwardly through said sleeve mouth between said spaced collet fingers in said collet sleeve guide grooves for location against the inner ends of said guide grooves.

2. The chuck set forth in claim 1, wherein each of said work back-up ring lugs has a chamfered end, and set screws carried in said collet sleeve engage said lugs chamfers to secure said back-up ring lugs against the inner ends of said guide grooves.

EARL L. DEVIS.
CHARLES E. UNKEFER.

REFERENCES CITED

The following references are of record in the file of this patent:

UNITED STATES PATENTS

| Number | Name | Date |
|---|---|---|
| 1,407,213 | Olson | Feb. 21, 1922 |
| 1,428,100 | Kohl | Sept. 5, 1922 |
| 1,455,554 | Sterchler | May 15, 1923 |
| 1,808,288 | Chapman et al. | June 2, 1931 |
| 2,283,514 | Stanworth | May 19, 1942 |
| 2,460,302 | Lundsten | Feb. 1, 1949 |
| 2,463,083 | Brownlee | Mar. 1, 1949 |